(12) United States Patent
Okubo

(10) Patent No.: US 9,098,796 B2
(45) Date of Patent: Aug. 4, 2015

(54) IMAGE FORMING DEVICE AND IMAGE FORMING METHOD

(71) Applicant: Oki Data Corporation, Tokyo (JP)

(72) Inventor: Tsuyoshi Okubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/943,838

(22) Filed: Jul. 17, 2013

(65) Prior Publication Data

US 2014/0022601 A1     Jan. 23, 2014

(30) Foreign Application Priority Data

Jul. 20, 2012   (JP) ................................. 2012-161609

(51) Int. Cl.
| | |
|---|---|
| *G06K 15/00* | (2006.01) |
| *G06K 15/02* | (2006.01) |
| *H04N 1/40* | (2006.01) |
| *B41J 2/21* | (2006.01) |
| *H04N 1/54* | (2006.01) |
| *H04N 1/60* | (2006.01) |

(52) U.S. Cl.
CPC .......... *G06K 15/1878* (2013.01); *B41J 2/2117* (2013.01); *G06K 15/1868* (2013.01); *H04N 1/40062* (2013.01); *G06K 15/02* (2013.01); *H04N 1/54* (2013.01); *H04N 1/603* (2013.01); *H04N 1/6058* (2013.01)

(58) Field of Classification Search
None
See application file for complete search history.

(56) References Cited

U.S. PATENT DOCUMENTS

| | | | |
|---|---|---|---|
| 7,679,795 B2 * | 3/2010 | Oki ............................... | 358/518 |
| 2007/0216920 A1 * | 9/2007 | Watanabe ...................... | 358/1.9 |
| 2008/0292130 A1 * | 11/2008 | Nafarieh et al. .............. | 382/100 |
| 2009/0097067 A1 * | 4/2009 | Cook et al. ................... | 358/1.15 |
| 2009/0244569 A1 * | 10/2009 | Watanabe ...................... | 358/1.9 |
| 2011/0051196 A1 * | 3/2011 | Hatanaka et al. .............. | 358/2.1 |
| 2013/0278660 A1 * | 10/2013 | Tsuji ............................. | 347/14 |

FOREIGN PATENT DOCUMENTS

JP        H01-109366       4/1989

* cited by examiner

*Primary Examiner* — Miya J Cato
(74) *Attorney, Agent, or Firm* — Rabin & Berdo, P.C.

(57) ABSTRACT

An image forming device has an image processing unit that generates first image data on the basis of image forming data describing an object. The first image data specify first gradation values of at least one black or chromatic color. The image processing unit also identifies certain pixels in an area in which the object is disposed, and generates second image data specifying a second gradation value that is greater than a predetermined gradation value for the identified pixels. An image forming unit forms a first image, based on the first image data, by using at least one black or chromatically colored developing agent, and forms a second image, based on the second image data, by using a white developing agent, thereby reproducing colors in white areas while reducing the usage of the white developing agent.

16 Claims, 12 Drawing Sheets

```
WHITE COMPONENT GENERATION : IMAGE

DO NOT GENERATE
   ▶    * ENTIRE OBJECT AREA
        INTERIOR OF OBJECT
```

FIG. 3

IMD

| COORDINATES | CMYK BUFFER COMPONENTS (C,M,Y,K) | W BUFFER COMPONENTS (W) |
|---|---|---|
| 600 | (0,45,45,0) | (0) |
| 601 | (255,255,255,0) | (0) |
| 602 | (0,0,0,255) | (0) |
| 603 | (0,0,0,0) | (255) |
| ⋮ | ⋮ | ⋮ |

(IMD1 = CMYK Buffer column, IMD2 = W Buffer column)

IMAGE FORMING DEVICE AND IMAGE FORMING METHOD

BACKGROUND OF THE INVENTION

1. Field of the Invention

The present invention relates to an image forming device, an image forming method, and an information processing device.

2. Description of the Related Art

Printers and similar image forming devices operate on the assumption that the color white is already present on the paper and use toner to print colors other than white. However, it is sometimes the case that printers print on media of a nonwhite color. When conventional image forming devices such as the copier described in Japanese Patent Application Publication No. 1-109366 print on media of a nonwhite color, in order to reproduce the color of white areas, they therefore use white toner and render the entire surface of the media white.

SUMMARY OF THE INVENTION

When these conventional image forming devices determine that white toner needs to be used, they whiten the entire surface of the paper, thereby consuming a large supply of white toner.

An object of the present invention is to reproduce white colors with less use of white toner.

In some embodiments, the invention provides an image forming device including an image processing unit and an image forming unit.

On the basis of image forming data describing an object, the image processing unit generates first image data specifying first gradation values of at least one color among black and chromatic colors, identifies certain pixels in an area in which the object is disposed, and generates second image data specifying a second gradation value greater than a predetermined gradation value for the identified pixels.

The image forming unit forms a first image, based on the first image data, by using a developing agent of the above at least one color, and forms a second image, based on the second image data, by using a white developing agent.

This scheme reduces the usage of white toner while still reproducing white colors in white areas.

BRIEF DESCRIPTION OF THE DRAWINGS

In the attached drawings:

FIG. 2 schematically shows an exemplary white setting input screen in the first embodiment;

FIG. 3 schematically shows the data structure of image data stored in the raster buffer in the first embodiment;

DETAILED DESCRIPTION OF THE INVENTION

Figure 1:
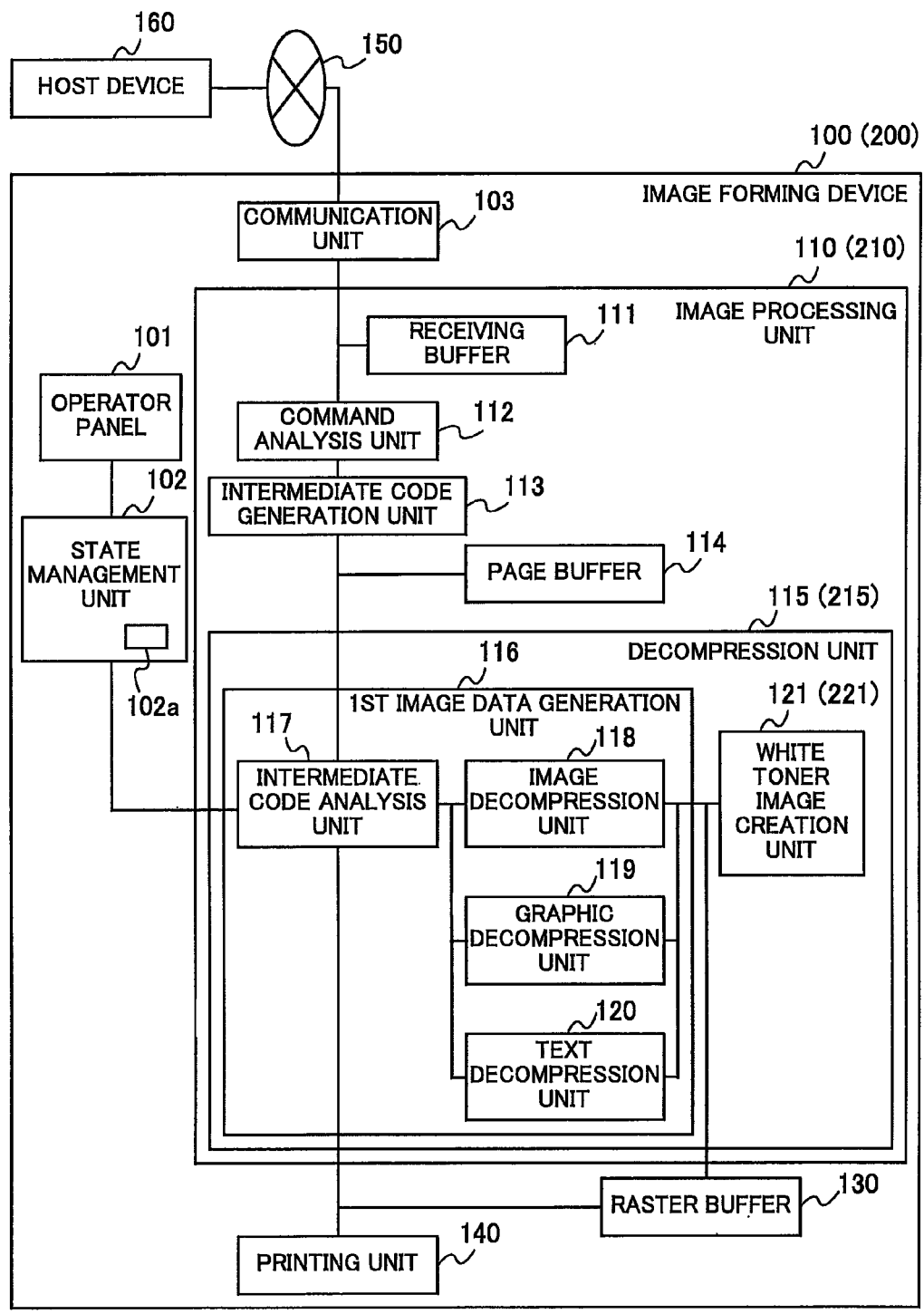
FIG. 1 is a block diagram schematically illustrating the configuration of an image forming device according to first and second embodiments of the invention.

Embodiments of the invention will now be described with reference to the attached drawings, in which like elements are indicated by like reference characters.

First Embodiment

Referring to FIG. 1, the image forming device 100 in the first embodiment is a printer that prints (forms) an image based on print data (image forming data) giving drawing commands in a page description language (PDL) or the like. The image forming device 100 is connected to a network 150. The image forming device 100 receives print data from a host device 160 connected to the network 150, and prints (forms) an image corresponding to the print data. The host device 160 is an information processing device such as a personal computer.

As shown in FIG. 1, the image forming device 100 includes an operator panel 101, a state management unit 102, a communication unit 103, an image processing unit 110, a raster buffer 130, and a printing unit 140. Elements in a second embodiment are indicated by reference characters in parentheses in FIG. 1.

The operator panel 101 includes a display unit for displaying information to the user on a screen, and an input unit for receiving input through operations by the user. The image forming device 100 can perform various settings according to input received through the operator panel 101. When a setting is changed by user input, the operator panel 101 directs the state management unit 102 to update its state information based on the setting change.

The state management unit 102 controls various states in the image forming device 100. The state management unit 102 includes, for example, a memory 102a that functions as a state storing unit for storing state information indicating the various states of the image forming device 100. On receiving a query from the operator panel 101 or an inquiry using a printer job language (PJL) from the host device 160 etc., the state management unit 102 responds by supplying the state of the setting specified by the query or the inquiry. When a state update is requested by the operator panel 101, or an update of a specific state is requested in PJL by the host device 160 etc., the state management unit 102 updates the state of the setting as requested.

The various states that the state management unit 102 controls include a setting (white setting) that indicates a method of generating white component image data. The white setting is one of the following: do not generate; entire object area; interior of object. This setting is made for each of three object types: text, graphics, and image. In the first embodiment, the object type indicates the type of rendering data that constitute an image in a page described in PDL. Data for drawing letters and other characters are text data; data for drawing vector graphics, line art, and the like are graphics data; bitmap data, multilevel image data, and the like are image data. The state management unit 102 has the operator panel 101 display a white setting input screen 170 as shown in FIG. 2, for example, and receive input of a white setting for each object type. Alternatively, when print data are generated by the host device 160, the state management unit 102 can accept, by reading the white setting from the print data, input of the white setting added by a printer driver of the host device 160. The state management unit 102 has the memory 102a store white setting information indicating the received white setting as an item of state information.

The communication unit 103 communicates with the network 150. For example, the communication unit 103 receives print data from the host device 160 over the network 150. The communication unit 103 supplies the received print data to the image processing unit 110.

The image processing unit 110 generates image data from print data. The image processing unit 110 includes a receiving buffer 111, a command analysis unit 112, an intermediate code generation unit 113, a page buffer 114, and a decompression unit 115.

The receiving buffer 111 is a print data memory for storing print data. In the first embodiment, the receiving buffer 111 stores print data supplied from the communication unit 103.

The command analysis unit 112 analyzes each of PDL commands included in print data. By analyzing the print data, the command analysis unit 112, for example, identifies objects to be drawn. More specifically, by analyzing the print data, the command analysis unit 112 identifies rendering numerical data indicating at least the positions and the colors of objects to be drawn and types of the objects. The command analysis unit 112 directs the intermediate code generation unit 113 to create intermediate code according to the information obtained by this analysis. The intermediate code is a common code, independent of any specific PDL, that the decompression unit 115 uses in creating a rendering image having cyan, magenta, yellow, and black (CMYK) components, a process referred to as CMYK decompression. The intermediate code enables the decompression processing to be standardized. The intermediate code includes image intermediate code specifying starting coordinates, scaling factors, etc. for drawing images, character intermediate code for drawing bitmapped font characters at specified coordinates, and rectangle intermediate code for drawing rectangles, specifying their width, height, and upper left corner coordinates. These types of intermediate code pair one-to-one with corresponding object types. The object type corresponding to image intermediate code is 'image'; the object type corresponding to character intermediate code is 'text'; the object type corresponding to rectangle intermediate code is 'graphics'. When the command analysis unit 112 has analyzed the commands for a single page, or has finished analyzing all the received data, it sends a code completion notification to the intermediate code generation unit 113.

The intermediate code generation unit 113 generates intermediate code in the page buffer 114 for each page, based on the results of the analysis by the command analysis unit 112. On receiving a code completion notification from the command analysis unit 112, the intermediate code generation unit 113 instructs the decompression unit 115 to start decompression of the completed page.

The page buffer 114 is a page memory for storing intermediate code. Intermediate code is stored in the page buffer 114 in page units.

The decompression unit 115 generates image data for the image to be printed. In the first embodiment, the decompression unit 115 generates image data indicating gradations of at least one color among black and one or more chromatic colors, and image data indicating gradations of white. By decompressing the intermediate code created by the intermediate code generation unit 113 and stored in the page buffer 114, the decompression unit 115, for example, creates CMYK image data and W image data in the raster buffer 130. The CMYK image data represent gradation values of the cyan, magenta, yellow, and black components of each pixel as integers from zero to 255, thus providing 256 gradation levels for each color. The W image data represent the gradation value of the white component as an integer from zero to 255, again providing 256 gradation levels for each pixel. For all pixels, the default values of both the CMYK image data and the W image data are zero, meaning that no toner image is formed.

The decompression unit 115 includes a first image data generating unit 116 and a white toner image creation unit 121 that functions as a second image data generating unit. The first image data generating unit 116 includes an intermediate code analysis unit 117, an image decompression unit 118, a graphic decompression unit 119, and a text decompression unit 120. The first image data generating unit 116 generates image data indicating gradation values of at least one color among black and one or more chromatic colors; the white toner image creation unit 121 generates image data indicating white gradation values.

The intermediate code analysis unit 117 decides on a decompression mode for each of the three object types: image, graphics, and text. On receiving a notification to start decompression from the intermediate code generation unit 113, for example, the intermediate code analysis unit 117, obtains the white setting information from the state management unit 102. The intermediate code analysis unit 117 determines the decompression mode for each object type according to the obtained white setting information. In the first embodiment, there are three decompression modes: white decompression, extended white decompression, and normal decompression. For an object type for which the white setting is 'do not generate', the intermediate code analysis unit 117 selects the normal decompression mode; for an object type for which the white setting is 'entire object area', the intermediate code analysis unit 117 selects the white decompression mode; for an object type for which the white setting is 'interior of object', the intermediate code analysis unit 117 selects the extended white decompression mode.

Next, the intermediate code analysis unit 117 starts analyzing the intermediate code for the page to be decompressed, starting from the first code item in code item units. The intermediate code analysis unit 117 directs the image decompression unit 118, graphic decompression unit 119, or text decompression unit 120 to perform white decompression, extended white decompression, or normal decompression according to the type of intermediate code and the selected decompression mode. For example, when the object type corresponding to an item of intermediate code is 'image', the intermediate code analysis unit 117 directs the image decompression unit 118 to perform decompression in the mode corresponding to the white setting information for 'image'; when the object type corresponding to an item of intermediate code is 'graphics', the intermediate code analysis unit 117 directs the graphic decompression unit 119 to perform decompression in the mode corresponding to the white setting information for 'graphics'; when the object type corresponding to an item of intermediate code is 'text', the intermediate code analysis unit 117 directs the text decompression unit 120 to perform decompression in the mode corresponding to the white setting information for 'text'. The intermediate code analysis unit 117 sends a decompression completion notification to the printing unit 140, when it has finished processing all the intermediate code for the received page.

When directed by the intermediate code analysis unit 117 to perform normal decompression, the image decompression unit 118, graphic decompression unit 119, and text decompression unit 120 draw objects as specified by the intermediate code in a CMYK buffer assigned in the raster buffer 130 for the page to be decompressed. When directed by the intermediate code analysis unit 117 to perform white decompression, the image decompression unit 118, graphic decompression unit 119, and text decompression unit 120 draw objects as specified by the intermediate code in the CMYK buffer assigned in the raster buffer 130 for the page to be decompressed, notify the white toner image creation unit 121 of the areas occupied by the objects drawn, and direct the white toner image creation unit 121 to perform white decompression. When directed by the intermediate code analysis unit 117 to perform extended white decompression, the image decompression unit 118, graphic decompression unit 119, and text decompression unit 120 draw objects as specified by the intermediate code in the CMYK buffer assigned in the raster buffer 130 for the page to be decompressed, notify the white toner image creation unit 121 of the areas occupied by the objects drawn, and direct the white toner image creation unit 121 to perform extended white decompression.

On receiving a drawn area notification and a direction to perform white decompression or extended white decompression from the image decompression unit 118, graphic decompression unit 119, or text decompression unit 120, the white toner image creation unit 121 calculates a target area according to the directed decompression mode, identifies white components in the calculated target area, and draws an object in a W buffer in the raster buffer 130. When white decompression is performed, the target area includes all pixels within the drawn area; when extended white decompression is performed, the target area includes only the pixels inside the boundary contours of the drawn object. In the first embodiment, after determining the target area, for each pixel in the target area, the white toner image creation unit 121 calculates the sum N of the gradation values of the pixel components in the CMYK buffer. When the sum N is equal to or less than a predetermined threshold value (zero in the first embodiment), the white toner image creation unit 121 sets the value of the white component of the corresponding pixel in the W buffer to a value greater than a predetermined value (to 255 in the first embodiment).

The raster buffer 130 includes the CMYK buffer and the W buffer. CMYK image data are stored in the CMYK buffer; W image data are stored in the W buffer.

As shown in FIG. 3, the CMYK image data IMD1 indicate gradations of the chromatic colors (C, M, Y) and black (K) for each coordinate (pixel) in a drawn object. The W image data IMD2 indicate gradations of white (W) for each coordinate (pixel) in the drawn object.

Returning to FIG. 1, the printing unit 140 is an image forming unit that, on receiving a decompression completion notification from the intermediate code analysis unit 117, prints an image based on the image data stored in the raster buffer 130. In the first embodiment, the printing unit 140 prints an image by using toner as a developing agent.

Figure 4:
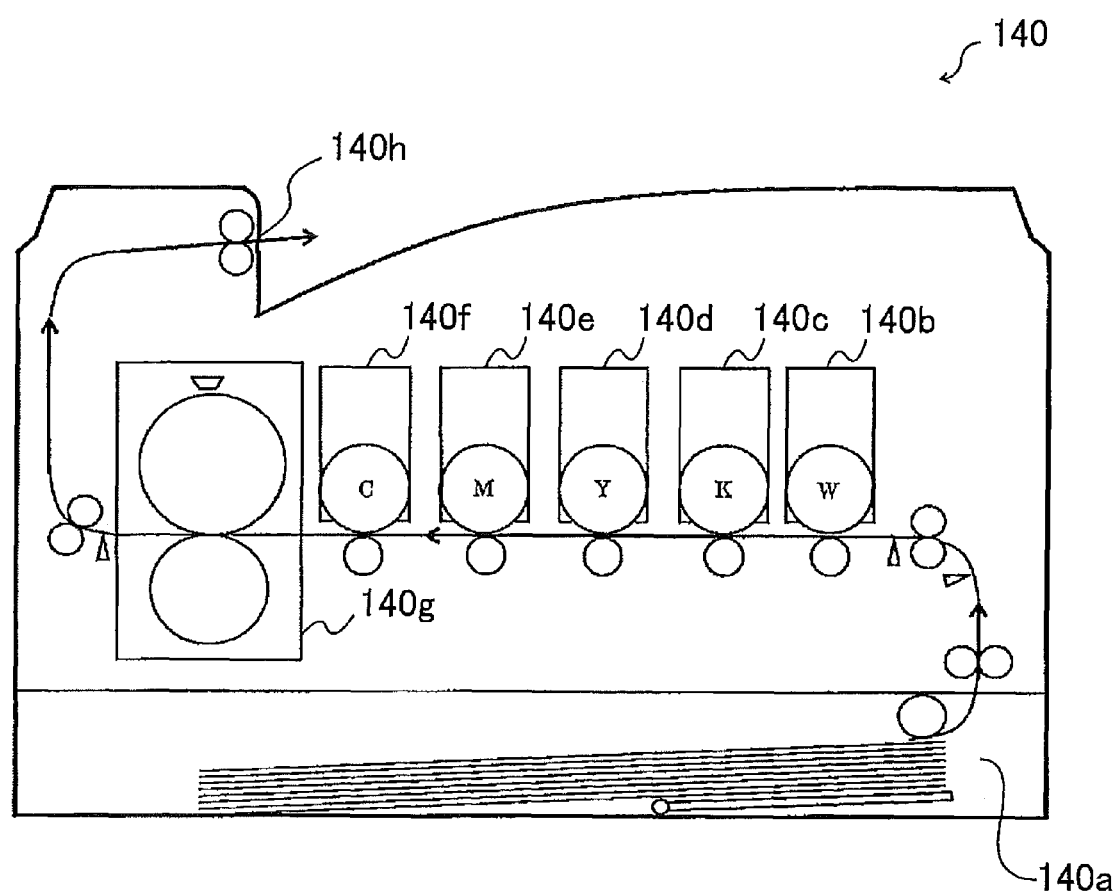
FIG. 4 is a sectional drawing schematically illustrating the structure of the printing engine in the first embodiment.

Referring to FIG. 4, the printing unit 140 includes a paper tray 140*a*, transfer units 140*b* to 140*f*, a fusing unit 140*g*, and a delivery port 140*h*.

The paper tray 140*a* supplies sheets of paper, which are the media on which images are printed.

The transfer units 140*b* to 140*f* transfer colored toner images to the sheets of paper supplied from the paper tray 140*a*. In the first embodiment, the transfer unit 140*b* that forms the white toner image is disposed upstream, on the paper transport path, of the transfer units 140*c* to 140*f* that transfer toner images of other colors.

The fusing unit 140*g* fuses the toner images transferred from the transfer units 140*b* to 140*f* to the sheets of paper.

The delivery port 140*h* ejects the sheets of paper onto which the toner images have been fused by the fusing unit 140*g*.

Figure 5:
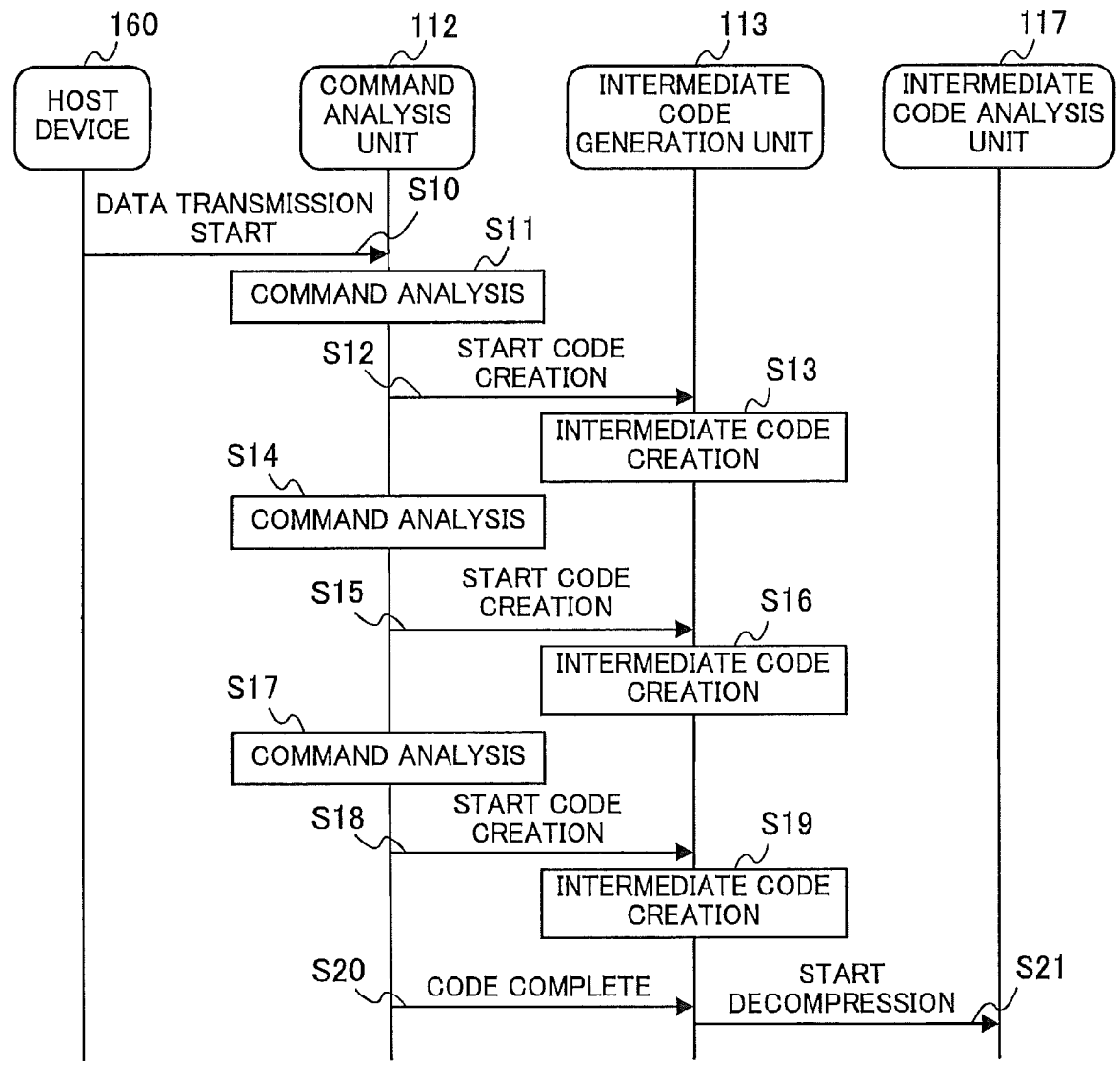
FIGS. 5 and 6 constitute a sequence diagram illustrating the printing processing performed by the image forming device in the first embodiment.
Figure 6:
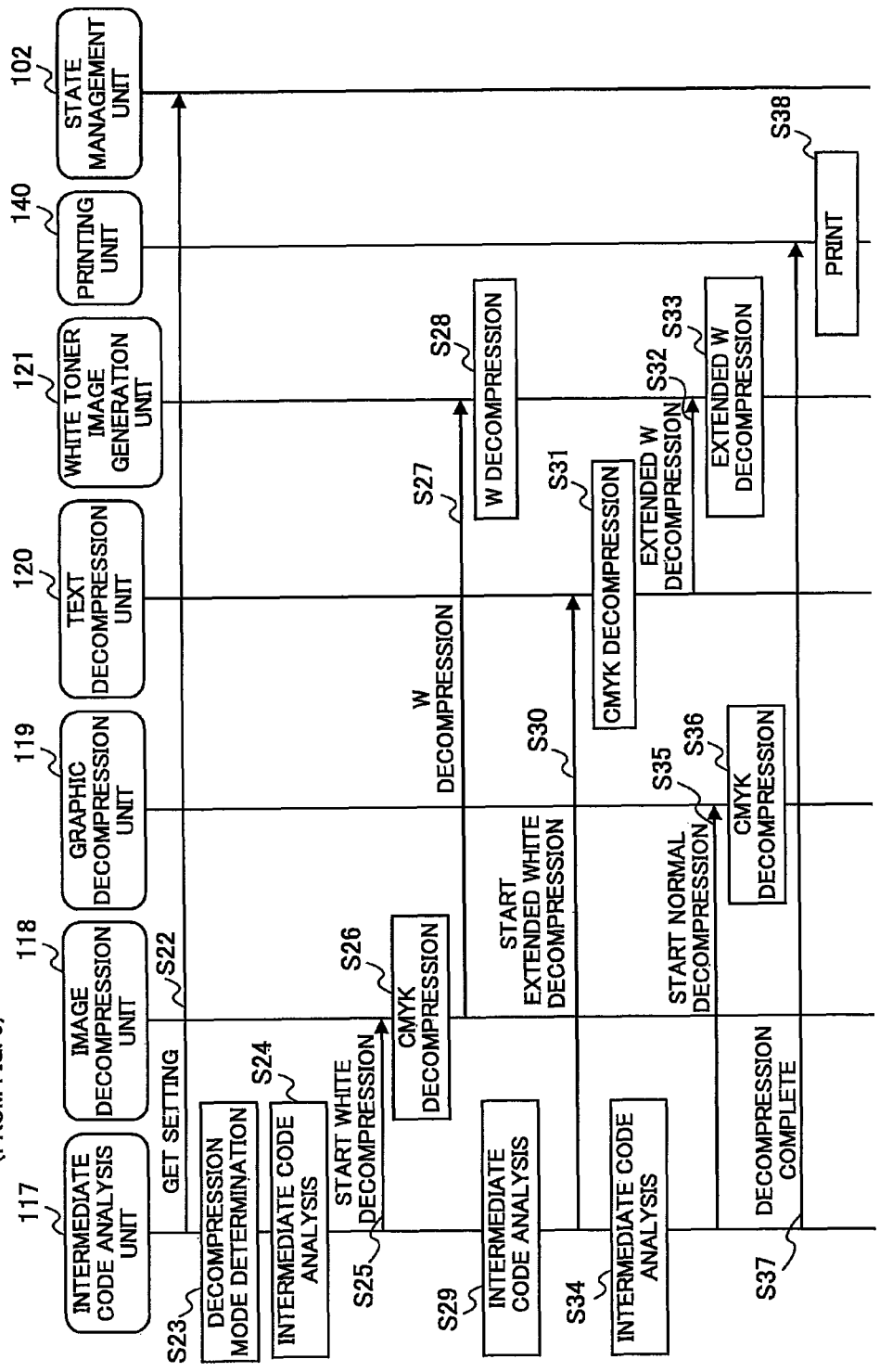

The processing carried out by the image forming device 100 during printing is illustrated in the exemplary sequence diagrams in FIGS. 5 and 6 on the assumption that white setting information has already been stored in the memory 102*a* in the state management unit 102. For example, it is assumed that the operator panel 101 has displayed the white setting input screen 170 shown in FIG. 2, and received input for updating the white setting from the user. It is further assumed that the input received from the user has selected 'entire object area' for the white components of images, 'do not generate' for the white components of graphics, and 'interior of object' for the white components of text. The operator panel 101 has notified the state management unit 102 of the received settings, and the state management unit 102 has updated the white setting information stored in the memory 102*a* to indicate 'entire object area' for the generation of white image data corresponding to images, 'interior of object' for the generation of white image data corresponding to text, and 'do not generate' for the generation of white image data corresponding to graphics. It is assumed that sheets of green paper are set in the paper tray 140*a*.

The processing illustrated in FIGS. 5 and 6 will be described on the basis of the assumptions given above.

The host device 160 to transmit print data to the image forming device 100 according to the operation input by the user (S10).

In the image forming device 100, the communication unit 103 receives the transmitted print data and the receiving buffer 111 stores the received print data. The command analysis unit 112 retrieves the print data from the receiving buffer 111 and starts command analysis of each PDL command included in the retrieved print data (S11). It is assumed that the first command is, for example, a command for drawing an image object, without size alteration, in an area with starting coordinates 610 and end coordinates 620. The command analysis unit 112 directs the intermediate code generation unit 113 to create image intermediate code (S12). The intermediate code generation unit 113 creates image intermediate code as directed by the command analysis unit 112, and stores the created image intermediate code in the page buffer 114 (S13).

The command analysis unit 112 then analyzes the next command (S14). It is assumed that the next command draws a white letter 'I' with a chromatic colored boundary in the MS Gothic font at coordinate 660. The command analysis unit 112 directs the intermediate code generation unit 113 to create character intermediate code (S15). The intermediate code generation unit 113 creates character intermediate code as directed by the command analysis unit 112 (S16).

The command analysis unit 112 then analyzes the next command (S17). It is assumed that the next command draws a rectangle having its upper left corner at coordinate 670, with gradation value '0' in all its CMYK components. The command analysis unit 112 directs the intermediate code generation unit 113 to create rectangle intermediate code (S18). The intermediate code generation unit 113 creates rectangle intermediate code as directed by the command analysis unit 112 (S19).

The command analysis unit 112 has now finished analyzing all the commands in the receiving buffer 111, so it sends a code completion notification to the intermediate code generation unit 113 (S20). On receiving this notification, the intermediate code generation unit 113 instructs the intermediate code analysis unit 117 to start decompression (S21), and the processing proceeds to step S22 in FIG. 6.

In step S22 in FIG. 6, the intermediate code analysis unit 117 queries the state management unit 102 for the white image data generation settings for images, text, and graphics. The state management unit 102 responds to this query by supplying the white setting information stored in the memory 102a to the intermediate code analysis unit 117. From the white setting information, the intermediate code analysis unit 117 determines the decompression mode corresponding to each object type (S23). Because the white setting information for images is 'entire object area', the intermediate code analysis unit 117 selects the white decompression mode for images. Because the white setting information for text is 'interior of object', the intermediate code analysis unit 117 selects the extended white decompression mode for text. Because the white setting information for graphics is 'do not generate', the intermediate code analysis unit 117 selects the normal decompression mode for graphics.

Next, the intermediate code analysis unit 117 analyzes the first intermediate code item in the page buffer 114 (S24). Because the first intermediate code item is an image intermediate code item, the intermediate code analysis unit 117 directs the image decompression unit 118 to perform white decompression according to the decompression mode selected for images (S25). The image decompression unit 118 performs CMYK decompression according to the image intermediate code, and draws an object in the CMYK buffer in the raster buffer 130 (S26). The image decompression unit 118 then directs the white toner image creation unit 121 to perform W decompression for a rectangular drawn area from coordinate 610 to coordinate 620 (S27). The white toner image creation unit 121 performs W decompression as directed by the image decompression unit 118 (S28). Because all uncolored parts of an object are drawn with white toner in W decompression in the first embodiment, the white toner image creation unit 121 draws an object in the W buffer in the raster buffer 130 to render the uncolored parts of the object white. The processing in step S28 will be described in further detail later with reference to FIG. 7.

The intermediate code analysis unit 117 then analyzes the next intermediate code item (S29). Because the next intermediate code item is a character intermediate code item, the intermediate code analysis unit 117 directs the text decompression unit 120 to perform extended white decompression according to the decompression mode selected for text (S30). The text decompression unit 120 performs CMYK decompression according to the character intermediate code, and draws an object in the CMYK buffer area from coordinate 660 to coordinate 650 in the raster buffer 130 (S31). The text decompression unit 120 then directs the white toner image creation unit 121 to perform extended W decompression for the rectangular drawn area from coordinate 660 to coordinate 650 occupied by the object (S32). The white toner image creation unit 121 performs extended W decompression as directed by the text decompression unit 120 (S33). Because uncolored parts inside the boundary of the object are drawn with white toner in extended W decompression in the first embodiment, the white toner image creation unit 121 draws an object in the W buffer in the raster buffer 130 to render the uncolored parts inside the boundary of the object white. The processing in step S33 will be described in further detail with reference to FIG. 7 below.

The intermediate code analysis unit 117 now analyzes the next intermediate code item (S34). Because the next intermediate code item is a rectangle intermediate code item, the intermediate code analysis unit 117 directs the graphic decompression unit 119 to perform normal decompression according to the decompression mode selected for graphics (S35). The graphic decompression unit 119 performs CMYK decompression according to the rectangle intermediate code, and draws an object in the CMYK buffer in the raster buffer 130 (S36).

The intermediate code analysis unit 117 has now finished processing all the intermediate code for the received page, so it sends a decompression completion notification to the printing unit 140 (S37). The printing unit 140 forms a white toner image based on the white image data stored in the W buffer, and cyan, magenta, yellow, and black toner images based on the CMYK image data stored in the CMYK buffer, and prints the white and CMYK images (S38).

Figure 7:
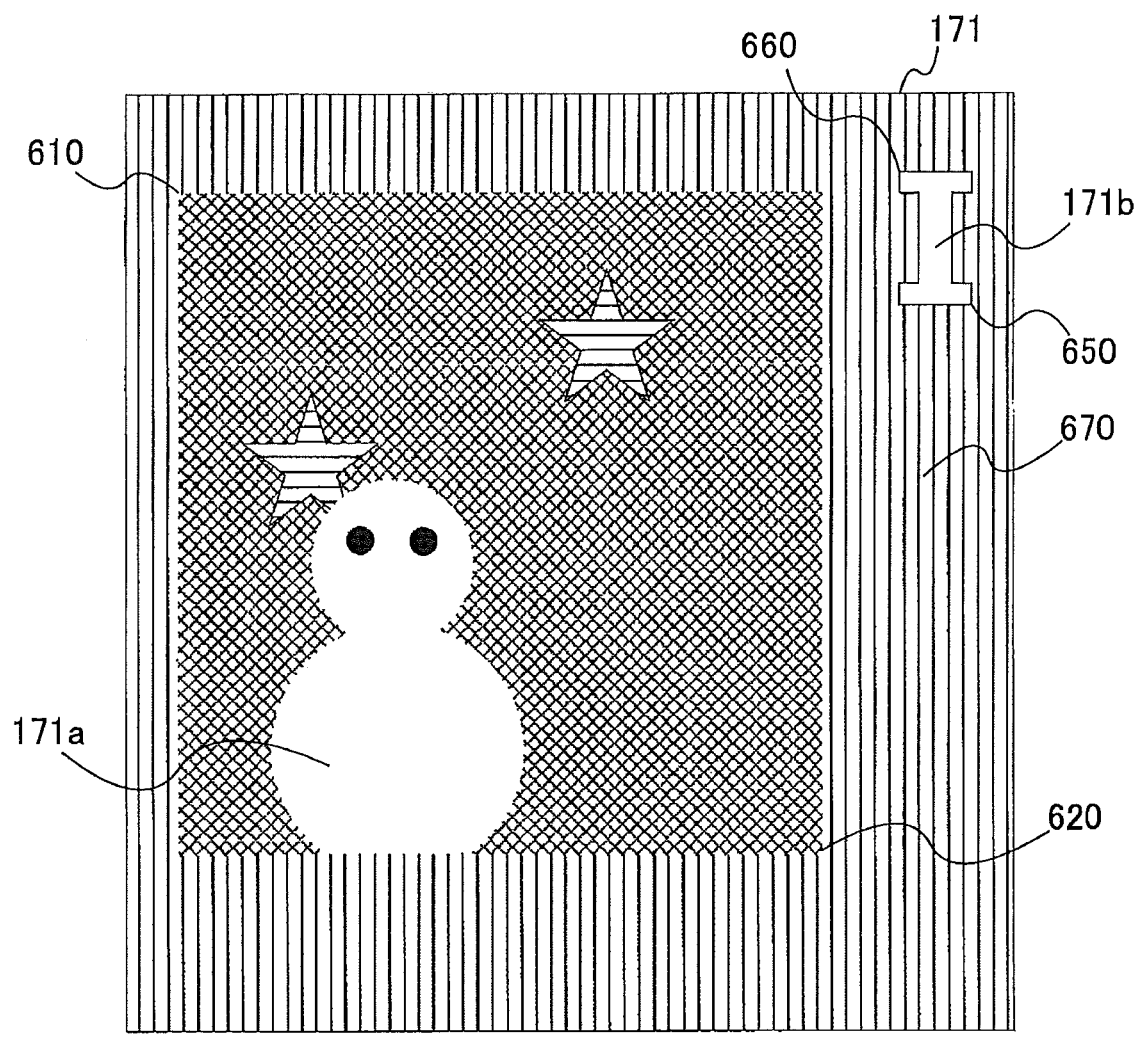
FIG. 7 schematically illustrates a printing result in the first embodiment.
Figure 8:
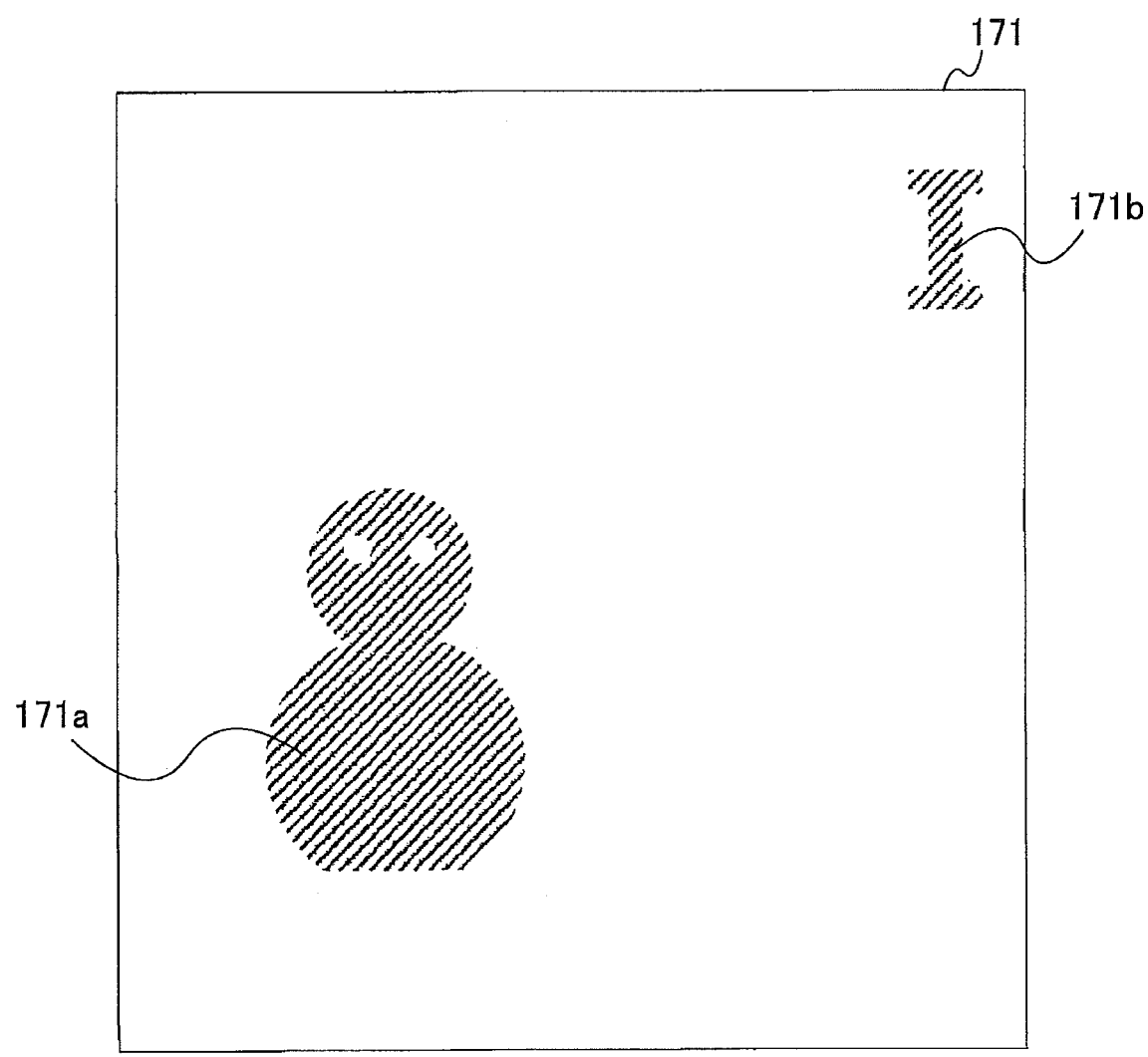
FIG. 8 schematically illustrates areas in which white images are printed in the first embodiment.

The printing result obtained in step S38 in FIG. 6 is illustrated in the exemplary diagram in FIG. 7. The areas in which white images are printed within the printing result are shown by hatching in the exemplary diagram in FIG. 8. The paper 171 is green. Images are printed in the area from coordinate 610 to coordinate 620; a white image is printed in an area 171a. A text image is printed in the area from coordinate 660 to coordinate 650; a white image is printed in the area 171b in the interior of the text image. Although the image data also specify drawing a rectangle starting from coordinate 670, because the gradation value is '0' in all its CMYK components and 'do not generate' is the white image data generation mode selected for graphics, no CMYK images and no white image are drawn.

In an area in which objects are drawn, pixels having no chromatic color toner components are usually expected to appear white. Especially in an area in which an image is drawn, when there are no chromatic color components, this does not mean that there is nothing to draw; it almost always means that the color white should be drawn. The image forming device 100 in the first embodiment can provide the user with the printing result the user expects, because the user can select whether or not to draw white objects in uncolored areas of each object type. In particular, the image forming device 100 in the first embodiment can render unwhitened the outermost uncolored part of the object in which it is expected not to draw white.

Figure 9:
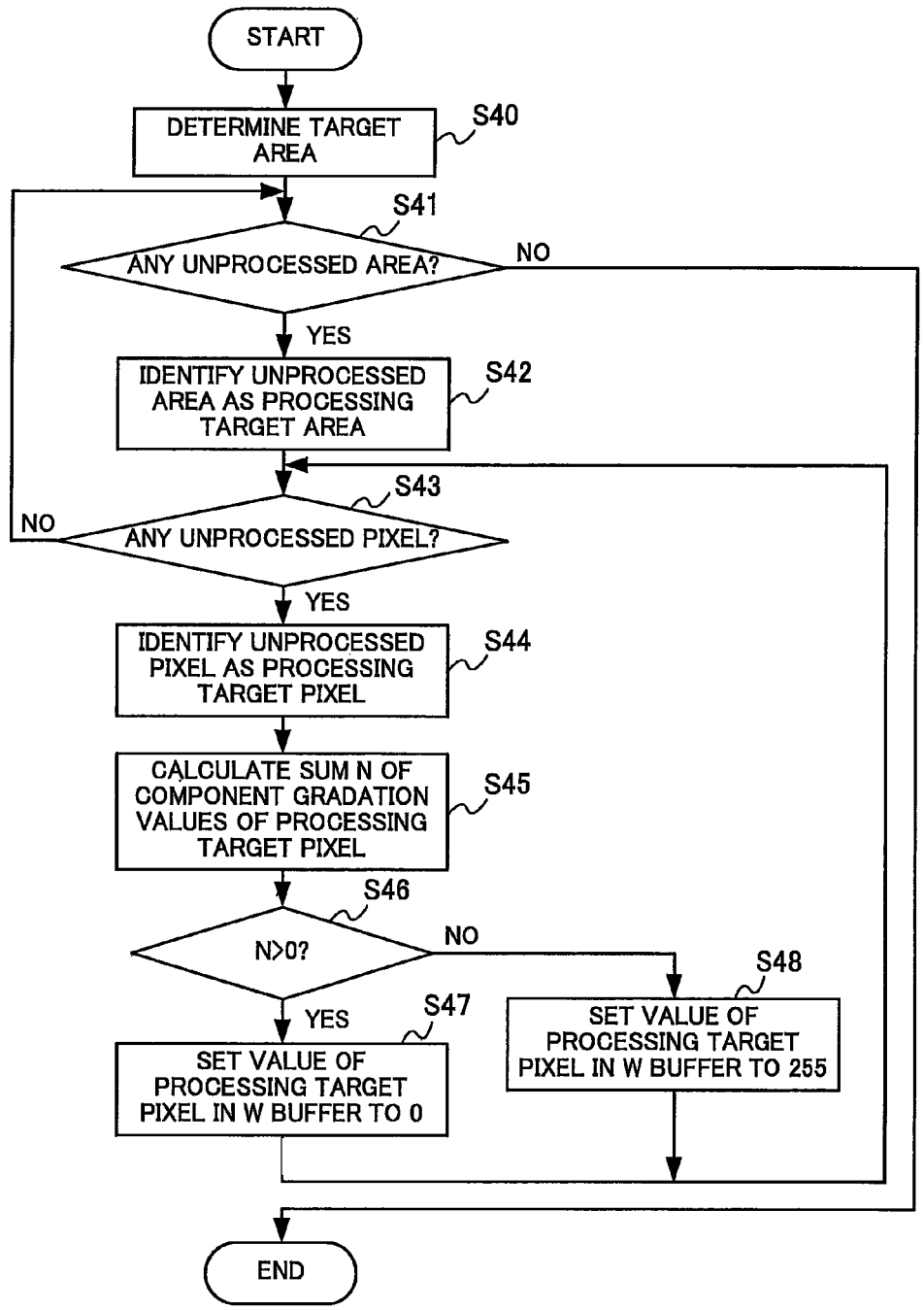
FIG. 9 is a flowchart illustrating processing performed in the white toner image creation unit in the first embodiment.

When the white toner image creation unit 121 is directed to perform W decompression or extended W decompression by the image decompression unit 118, graphic decompression unit 119, or text decompression unit 120, it begins the processing illustrated in the flowchart in FIG. 9.

First, the white toner image creation unit 121 determines the target area to be processed (S40). The method of determining the target area will be described in further detail with reference to FIG. 10 below.

Next, the white toner image creation unit 121 decides whether there is an unprocessed area within the target area designated in step S40 (S41). If there is an unprocessed area (S41: Yes), the processing proceeds to step S42; if there is no unprocessed area (S41: No), the processing ends.

In step S42, the white toner image creation unit 121 identifies a single unprocessed target area as a processing target area. The white toner image creation unit 121 decides whether there is any unprocessed pixel in the processing target area (S43). If there is any unprocessed pixel (S43: Yes), the processing proceeds to step S44; if there is no unprocessed pixel (S43: No), the processing returns to step S41.

In step S44, the white toner image creation unit 121 specifies a single unprocessed pixel as a processing target pixel. The white toner image creation unit 121 calculates the sum N of the gradation values of the components of this pixel in the CMYK buffer in the raster buffer 130 (S45).

Next, the white toner image creation unit 121 decides whether the sum N is greater than zero (S46), proceeds to step S47 if the sum N is greater than zero (S46: Yes), and proceeds to step S48 if the sum N is equal to zero (S46: No).

In step S47, the white toner image creation unit 121 sets the gradation of the processing target pixel to zero in the W buffer in the raster buffer 130 and returns to step S43.

In step S48, the white toner image creation unit 121 sets the gradation of the processing target pixel to 255 in the W buffer in the raster buffer 130 and returns to step S43.

Figure 10:
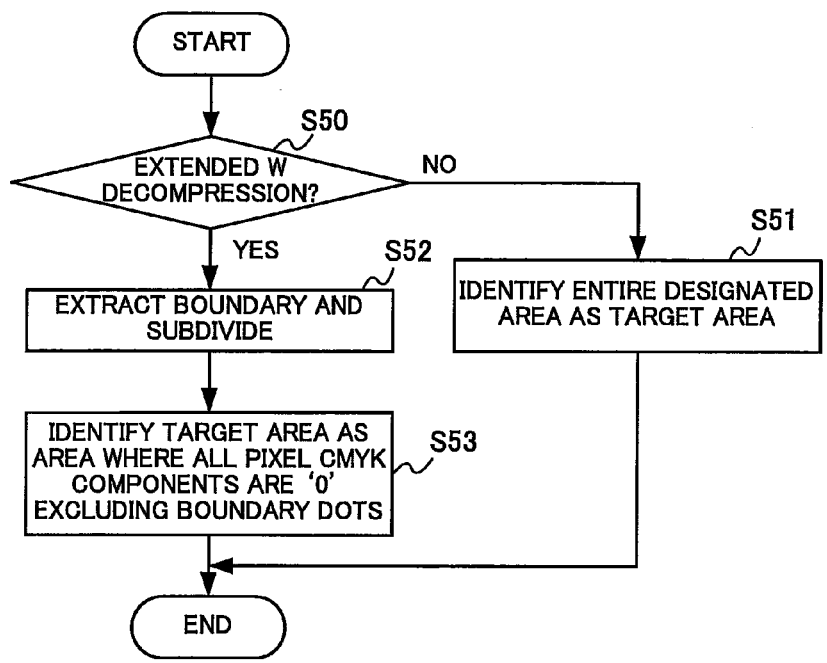
FIG. 10 is a flowchart illustrating the process of determining which areas to process in the first embodiment.

The process of determining which areas to process in step S40 in FIG. 9 is illustrated in FIG. 10.

First, the white toner image creation unit 121 decides whether it has been instructed by the image decompression unit 118, graphic decompression unit 119, or text decompression unit 120 to perform extended W decompression or not (S50). If it has not been instructed to perform extended W decompression (S50: No), that is, if it has been instructed to perform W decompression, the processing proceeds to step S51; if it has been instructed to perform extended W decompression (S50: Yes), the processing proceeds to step S52.

In step S51, the white toner image creation unit 121 identifies as the target area all the drawn areas reported by the image decompression unit 118, graphic decompression unit 119, and text decompression unit 120.

Figure 11:
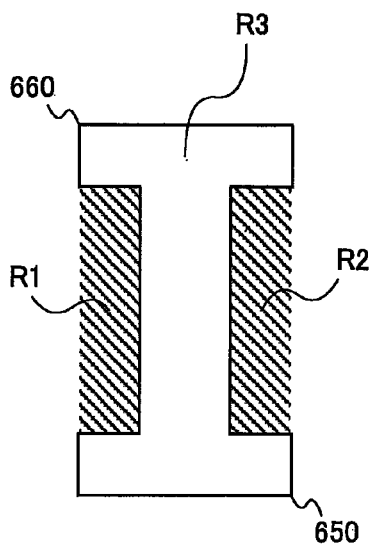
FIG. 11 is an explanatory diagram illustrating the process of determining which areas to process in the first embodiment.

In step S52, the white toner image creation unit 121 extracts boundaries from the CMYK image data that are stored in the CMYK buffer in the raster buffer 130 and included in the drawn area reported by the graphic decompression unit 119 and text decompression unit 120, and subdivides the drawn area by using the extracted boundaries. For example, if the drawn area is the rectangular area from coordinate 660 to coordinate 650 as shown in FIG. 11, the boundary of the letter 'I' is extracted. The drawn area is therefore divided into areas R1 and R2 exterior to the boundary of the letter 'I' and an area R3 in the interior of the letter 'I'.

The boundary may be extracted by using a conventional edge detection method such as canny edge detection.

For example, proceeding according to canny edge detection, the white toner image creation unit 121 smoothes the CMYK image data in the drawn area by using a Gaussian filter to reduce the effects of noise, then calculates edge intensity and gradient direction based on the noise-reduced data. The white toner image creation unit 121 also performs a thinning process on edges that have been widened by the Gaussian filter. The white toner image creation unit 121 then performs hysteresis thresholding using, for example, two threshold values: an upper threshold value and a lower threshold value. The white toner image creation unit 121 decides that a pixel with a value equal to or greater than the higher threshold value is an edge pixel and a pixel with a value less than the lower threshold value is a non-edge pixel. The white toner image creation unit 121 also decides that a pixel with a value less than the higher threshold value and equal to or greater than the lower threshold value is an edge-pixel if there is a neighboring edge pixel, and is a non-edge pixel if there is no neighboring edge pixel.

The white toner image creation unit 121 now determines the target area by excluding the extracted boundary and the subdivided areas in the drawn area that are exterior to the extracted boundary (S53). In the exemplary diagram in FIG. 11, the areas R1 and R2 exterior to the letter 'I' are excluded and the area R3 in the interior of the letter 'I' is identified as the target area.

As described above, the first embodiment can select whether or not to generate a white image for each object type, and when a white image is to be generated, whether to generate the white image in the entire object area or only in part of the interior of the object. In either case, when the white image is generated, it includes only pixels located in the object that have no chromatic color toner components, the first embodiment can conserve white toner keeping high color reproducibility.

In the first embodiment described above, because the transfer unit 140b for white toner is disposed upstream of the other transfer units as shown in FIG. 4, the white image is printed in the lowest image layer on the medium, and the other colors are drawn in higher layers and overlaid on the white image, but this scheme is exemplary and not limiting. For example, in a device configuration in which the toner images are transferred from the transfer units to one medium and then from the one medium to another medium, the white-toner transfer unit may be disposed downstream of the other transfer units.

In the first embodiment described above, when the sum N of the gradation values of the black and chromatic colors of a pixel is zero, the white value of the pixel is set to 255, but this white value is also exemplary and not limiting. It will be appreciated that any white value greater than zero may be assigned to the pixel.

Second Embodiment

Referring again to FIG. 1, the image forming device 200 in the second embodiment includes the operator panel 101, state management unit 102, communication unit 103, raster buffer 130, and printing unit 140 described in the first embodiment and a different image processing unit 210.

The image processing unit 210 generates image data from print data. The image processing unit 210 includes the receiving buffer 111, command analysis unit 112, intermediate code generation unit 113, and page buffer 114 described in the first embodiment and a different decompression unit 215.

The decompression unit 215 generates image data for the image to be printed. The decompression unit 215 includes the first image data generating unit 116 described in the first embodiment and a different white toner image creation unit 221 that functions as a second image data generating unit.

Figure 12:
FIG. 12 schematically shows the data structure of image data stored in the raster buffer in the second embodiment.

Like the white toner image creation unit 121 in the first embodiment, the white toner image creation unit 221 in the second embodiment calculates, for each pixel in the target area, the sum N of the gradation values of the pixel components in the CMYK buffer. Instead of setting the white value of the pixel (the gradation value of the W component of the pixel) to 255 when N is zero and to zero otherwise, however, the white toner image creation unit 221 in the second embodiment sets the white value of the pixel to a value that increases as N decreases. For example, when the sum N is equal to or less than 63, the white toner image creation unit 221 sets the white value of the pixel to 255. When N is equal to or greater than 64 and equal to or less than 254, the white toner image creation unit 221 sets the white value of the pixel to 128. When N is equal to or greater than 255 and equal to or less than 509, the white toner image creation unit 221 sets the white value of the pixel to 32. When N is equal to or greater than 510, the white toner image creation unit 221 sets the white value to zero. The gradation value of the W image data IMD#2 stored in the raster buffer 130 is therefore 0, 32, 128, or 255 as shown in FIG. 12.

Although the white value of the pixel is set to 0, 32, 128, or 255 in the second embodiment, these white values are also exemplary and not limiting. For example, when the sum N is equal to or greater than 510, a white value greater than zero may be assigned to the pixel. The above ranges of N are also exemplary and not limiting.

Figure 13:
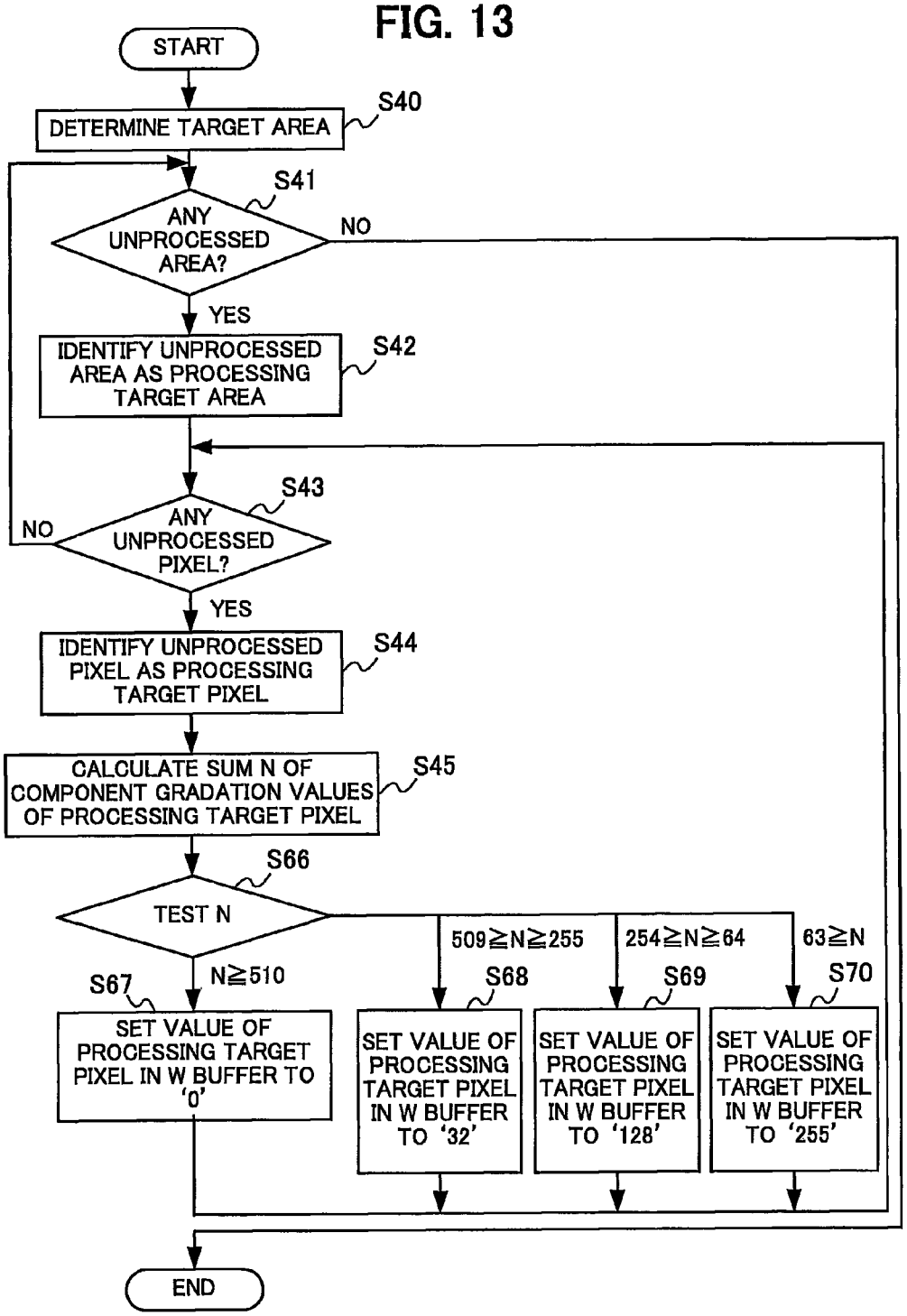
FIG. 13 is a flowchart illustrating processing performed in the white toner image creation unit in the second embodiment.

When the white toner image creation unit 221 is directed to perform W decompression or extended W decompression by the image decompression unit 118, graphic decompression unit 119, or text decompression unit 120, it begins the processing illustrated in the flowchart in FIG. 13. The steps in FIG. 13 that are indicated by the same reference characters as in FIG. 9 are identical to the corresponding steps in FIG. 9.

The processing from step S40 to step S45 in FIG. 13 is thus the same as in FIG. 9.

After the white toner image creation unit 221 calculates the sum N of the gradation values of the pixel components in the CMYK buffer in the raster buffer 130 in step S45, the processing proceeds to step S66.

In step S66, the white toner image creation unit 221 tests the value of the sum N and proceeds to step S67 if N is equal to or greater than 510, to step S68 if N is equal to or greater than 255 and equal to or less than 509, to step S69 if N is equal to or greater than 64 and equal to or less than 254, and to step S70 if N is equal to or less than 63.

In step S67, the white toner image creation unit 221 sets the gradation value of the processing target pixel to '0' in the W buffer in the raster buffer 130, and then returns to step S43.

In step S68, the white toner image creation unit 221 sets the gradation value of the processing target pixel to '32' in the W buffer in the raster buffer 130, and then returns to step S43.

In step S69, the white toner image creation unit 221 sets the gradation value of the processing target pixel to '128' in the W buffer in the raster buffer 130, and then returns to step S43.

In step S70, the white toner image creation unit 221 sets the gradation value of the processing target pixel to '255' in the W buffer in the raster buffer 130, then returns to step S43.

As described above, the image forming device 200 in the second embodiment conserves white toner by drawing a high-density white image in places where the low density of the CMYK components would allow the color of the print medium to show through the image, and drawing a low-density white image in places where the density of the CMYK components is high enough to conceal the color of the print medium.

In the first embodiment and second embodiment described above, the W image data are created by the image forming device 100, 200. The creation of the W image data by the image forming device 100, 200 is exemplary and not limiting. For example, the host device 160 may create the W image data and add the created W image data to the print data. The host device in this case is described with reference to FIG. 14.

Figure 14:
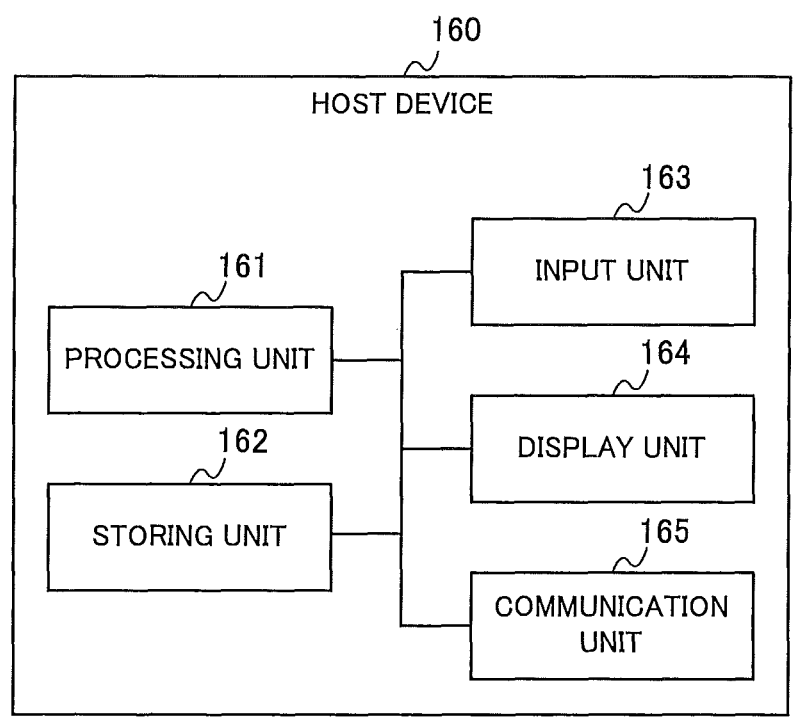
FIG. 14 is a block diagram schematically illustrating the configuration of a host device according to first and second embodiments of the invention.

As shown in FIG. 14, the host device 160 includes a processing unit 161, a storing unit 162, an input unit 163, a display unit 164, and a communication unit 165. The processing unit 161 and storing unit 162 function as the state management unit 102, image processing unit 110, 210, and raster buffer 130; the input unit 163 and display unit 164 function as the operator panel 101. With this configuration, the host device 160 may create the W image data. The processing unit 161 generates an expanded print data by adding the created W image to the print data. The communication unit 165 transports the expanded print data to the image forming device 100, 200. The image forming device 100, 200 can print the white image by operating the expanded print data like conventional image forming devices. In this case, as the host device 160 does not need to print any image, the processing unit 161 does not need to decompress the print data. So, the processing unit 161 may create the W data by using the rendering numerical data and types of the objects described above. Therefore, the processing unit 161 may identify pixels in which gradation values of an object included in print data are equal to or less than a predetermined value in an area in which the object is disposed, and generate image data for forming an image by using white developing agents at the identified pixels. For example, the processing unit 161 identifies pixels in which gradation values of the object are equal to zero and generates the image data by setting gradation values using the white developing agents in the identified pixels.

Although the exemplary image forming device is a printer in the first and second embodiments, the invention may be used in various other image forming devices such as copiers, facsimile machines, and multifunction devices.

Those skilled in the art will recognize that further variations are possible within the scope of the invention, which is defined in the appended claims.

What is claimed is:

1. An image forming device comprising:
   an image processing unit for generating first image data specifying first gradation values of at least one color among black and chromatic colors and generating second image data specifying second gradation values such that the second gradation values are each greater than a first predetermined value when a sum of the first gradation values is equal to or less than a second predetermined value; and
   an image forming unit for forming a first image layer, based on the first image data, by using a developing agent of the at least one color among black and the chromatic colors, and forming a second image layer, based on the second image data, by using a white developing agent.

2. The image forming device of claim 1, wherein the image processing unit generates the second image data such that the second gradation values are greater than zero when the sum of the first gradation values is zero and the second gradation values are zero when the sum of the first gradation values is greater than zero.

3. An image forming device comprising:
   an image processing unit for generating first image data specifying first gradation values of at least one color among black and chromatic colors and generating second image data to render uncolored parts in the first image data white; and
   an image forming unit for forming a first image layer, based on the first image data, by using a developing agent of the at least one color among black and the chromatic colors, and forming a second image layer, based on the second image data, by using a white developing agent;
   wherein the image processing unit generates the first image data on a basis of image forming data describing an object, identifies certain pixels in an area in which the object is disposed, and generates the second image data by specifying second gradation values such that the second gradation value for each single pixel in the identified pixels is greater than a first predetermined value when a sum of the first gradation values for that single pixel is equal to or less than the second predetermined value.

4. The image forming device of claim 3, wherein the image processing unit generates the second image data such that the second gradation values of the identified pixels increase as the first gradation values of the identified pixels decrease.

5. The image forming device of claim 3, wherein the image processing unit generates the second image data such that each second gradation value of each identified pixel is greater than zero when the first gradation values are all zero.

6. The image forming device of claim 3, further comprising a state memory for storing white setting information indicating a mode for generating the second image data for each of a plurality of object types, wherein the image processing unit generates the second image data according to the mode indicated by the white setting information.

7. The image forming device of claim 6, wherein the white setting information indicates at least one mode among a first mode in which all pixels included in the area in which the object is disposed are includible among the identified pixels, and a second mode in which only pixels inside a boundary of the object are includible among the identified pixels.

8. The image forming device of claim 7, wherein the object types include text, graphics, and image.

9. The image forming device of claim 7, further comprising an input unit for receiving the white setting information.

10. The image forming device of claim 3, wherein the image forming unit overlays the first image layer on the second image layer.

11. The image forming device of claim 3, wherein the image processing unit includes a command analysis unit for identifying objects by analyzing the image forming data, and a decompression unit for generating the first image data and the second image data on the basis of the objects identified by the command analyzing unit.

12. The image forming device of claim 11, wherein by analyzing the image forming data, the command analysis unit identifies numeric drawing data for drawing an object and identifies the type of the object.

13. The image forming device of claim 11, wherein the image processing unit further includes an intermediate code generation unit for generating intermediate code describing the object identified by the command analyzing unit, wherein the decompression unit generates the first image data and the second image data from the intermediate code created by the intermediate code generation unit.

14. The image forming device of claim 11, wherein the decompression unit includes a first image data generating unit for generating the first image data, and a second image data generating unit for generating the second image data.

15. An image forming method comprising:
generating first image data specifying first gradation values of at least one color among black and chromatic colors;
generating second image data specifying second gradation values such that each second gradation value is greater than a first predetermined value when a sum of the first gradation values is equal to or less than a second predetermined value;
forming a first image layer, based on the first image data, by using a developing agent of the at least one color among black and the chromatic colors; and
forming a second image layer, based on the second image data, by using a white developing agent.

16. The image forming method of claim 15, wherein the second image data is generated such that the second gradation values are greater than zero when the sum of the first gradation values for a single pixel is zero and the second gradation values are zero when the sum of the first gradation values for the single pixel is greater than zero.

* * * * *